United States Patent Office 3,095,426
Patented June 25, 1963

3,095,426
SYNTHESIS OF 1,2'-DINAPHTHALENE
2,1'-OXIDE
David W. Peck, Charleston, W. Va., assignor to Union
Carbide Corporation, a corporation of New York
No Drawing. Filed Nov. 23, 1960, Ser. No. 71,160
4 Claims. (Cl. 260—346.2)

This invention relates to a new process for the preparation of 1,2'-dinaphthalene 2,1'-oxide, also known as dinaphthol-1,2,1',2'-furan.

Prior to this invention 1,2'-dinaphthalene 2,1'-oxide was produced by a complicated process involving the conversion of tetralone to 1-keto-2-(1'-tetralylidene)-1,2,3,4-tetrahydronaphthalene followed by the conversion of that compound to 1,2'-dinaphthalene 2,1'-oxide. This process is extremely complex and results in very low yields of the dinaphthalene oxide.

I have discovered that 1,2'-dinaphthalene 2,1'-oxide can be prepared in good yields by a relatively simple process. The process of this invention essentially comprises heating tetralone at elevated temperatures in the presence of oxygen and thereafter recovering 1,2'-dinaphthalene 2,1'-oxide.

The process of this invention is illustrated by the following schematic equation:

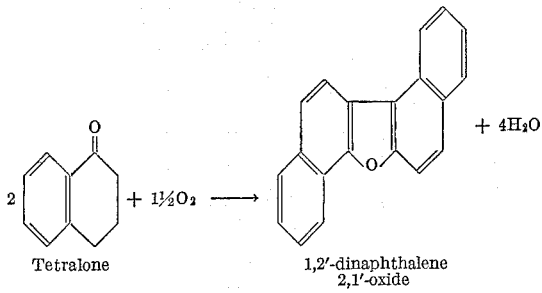

Tetralone      1,2'-dinaphthalene 2,1'-oxide

The process of this invention can be conducted either continuously or batchwise by contacting tetralone with gaseous oxygen. Air is the preferred source of oxygen although pure oxygen or air enriched with oxygen can also be employed. Any method known to those skilled in the art for conducting reactions between gases and liquids can be employed in carrying out the process of this invention. For example, the gas can be bubbled through the tetralone as in a bubble tower, or other vapor-liquids contacting devices such as turbo-absorbers and turbo-mixers can be employed.

The process of my invention can be conducted at an oxygen pressure of from about 0.1 atmosphere or less to about 10 atmospheres or more. It is preferred, however, to conduct the process of this invention at an oxygen pressure of from about 0.2 atmosphere to about 1 atmosphere.

The oxygen feed rate to the reaction can be from about 0.05 mole of oxygen or less to about 2.0 moles of oxygen or more per mole of tetralone per hour. The preferred rate, however, is from about 0.1 to about 0.5 mole of oxygen per mole of tetralone per hour.

Reaction times of from about 1 hour or less to about 50 hours or more can be employed, depending upon the amount of oxygen present and the degree of agitation. Reaction times of from about 5 to about 30 hours are preferred, however. Reaction times of less than 5 hours are generally insufficient to permit formation of the dinaphthalene oxide, when air is the oxygen-containing gas, and for that reason are not desirable. Reaction times of greater than 30 hours are undesirable because side reactions have a chance to occur, thus reducing the yield of dinaphthalene oxide.

The process of this invention can be conducted at a temperature of from about 200° C. to about 300° C. but is preferably conducted at a temperature of from about 240° C. to about 260° C.

The process of this invention is catalyzed by the presence of metallic iron. Although the process of my invention can be conducted without such a catalyst, the iron catalyst is preferably employed. Metallic iron in any form can be employed but it is preferred to use powdered iron. In general, a catalytic amount of from about 0.5 to about 25 weight percent of metallic iron, based upon the amount of 1-tetralone charged to the reaction, can be employed. It is preferred, however, to use from about 1 to about 10 weight percent of powdered iron, based upon the weight of tetralone. In addition to increasing the reaction rate, the use of iron as a catalyst reduces the amount of side products formed.

After completion of the reaction, the 1,2'-dinaphthalene 2,1'-oxide can be recovered by contacting the reaction mixture with an organic solvent for the tetralone, but not for the dinaphthalene oxide, at a temperature of from 15° C. to about 35° C., thereby causing the dinaphthalene oxide to precipitate out. Suitable solvents include ethers, such as isopropyl ether and aromatic hydrocarbons, such as benzene.

If powdered iron is employed as a catalyst the precipitate will contain iron. The oxide can be purified by dissolving the precipitate at a temperature of from about 40° C. to about 80° C. in an organic solvent, as for example ketones, such as acetone, carbon disulfide, ethers, such as isopropyl ether and aromatic hydrocarbons, such as benzene. The iron is removed from the solution by conventional means, such as filtration, decantation or centrifugation and after evaporating off the solvent 1,2'-dinaphthalene 2,1'-oxide is recovered.

A preferred embodiment of the process of this invention comprises heating a mixture containing 100 parts by weight of tetralone and 10 parts by weight of iron powder at a temperature of from about 240° C. to about 260° C., with agitation, passing air at atmospheric pressure through said tetralone-iron mixture for from about 5 to about 20 hours and thereafter pouring the reaction mixture into from about 100 milliliters to about 1 liter per 100 grams of tetralone charged of isopropyl ether at a temperature of 20° C. to about 30° C. The solids that formed are filtered out of the ether solution and the solids are leached with from about 200 milliliters to about 2 liters per 100 grams of tetralone charged of benzene at a temperature of from about 60° C. to about 70° C. The benzene is evaporated, leaving 1,2'-dinaphthalene 2,1'-oxide.

1,2'-dinaphthalene 2,1'-oxide has a very intense ultraviolet spectrum. Accordingly, it can be used as a filter for ultra-violet light, such as by incorporating it in polyethylene to provide a sun screen.

The following example is illustrative.

Example

One hundred grams of 1-tetralone were mixed with 10 grams of iron powder and heated to 250° C. Air was passed through the mixture at a rate of 175 cc. per minute for 20 hours. The reaction product was poured into 400 milliliters of isopropyl ether, whereupon solids precipitated and were filtered off. The solids were leached with benzene to remove the organic product from the iron. Upon evaporation of the benzene, there were obtained 58 grams of 1,2'-dinaphthalene 2,1'-oxide as identified by its infrared spectrum.

I claim:
1. The process for producing 1,2'-dinaphthalene 2,1'-oxide which comprises reacting tetralone with oxygen at a temperature of from about 200° C. to about 300° C.

and recovering 1,2'-dinaphthalene 2,1'-oxide from the resulting reaction mixture.

2. The process for producing 1,2'-dinaphthalene 2,1'-oxide which comprises reacting tetralone with oxygen in the presence of a catalytic amount of metallic iron at a temperature of from about 200° C. to about 300° C. and recovering 1,2'-dinaphthalene 2,1'-oxide from the resulting reaction mixture.

3. The process for producing 1,2'-dinaphthalene 2,1'-oxide which comprises reacting tetralone with oxygen in the presence of from about 1 to about 10 weight percent of metallic iron, based upon the weight of tetralone, at a temperature of from about 200° C. to about 300° C.
and recovering 1,2'-dinaphthalene 2,1'-oxide from the resulting reaction mixture.

4. The process for producing 1,2'-dinaphthalene 2,1'-oxide which comprises reacting 1-tetralone with oxygen, by heating said tetralone in the presence of from about 1 to about 10 weight percent of powdered iron, based upon the weight of said tetralone, at a temperature of from about 200° C. to about 300° C. while bubbling oxygen through said mixture and thereafter recovering 1,2'-dinaphthalene 2,1'-oxide.

References Cited in the file of this patent

Clemo et al.: J. Chem. Soc. (London) (1928), pages 2811–19; particularly at pages 2811–2 and 2815–16.